(12) United States Patent
Yahagi et al.

(10) Patent No.: US 6,809,883 B2
(45) Date of Patent: Oct. 26, 2004

(54) AUTOFOCUS SYSTEM

(75) Inventors: Satoshi Yahagi, Fuchu (JP); Tadashi Sasaki, Okegawa (JP)

(73) Assignee: Fuji Photo Optical Co., Ltd., Saitama City (JP)

(*) Notice: Subject to any disclaimer, the term of this patent is extended or adjusted under 35 U.S.C. 154(b) by 87 days.

(21) Appl. No.: 10/358,294

(22) Filed: Feb. 5, 2003

(65) Prior Publication Data

US 2003/0174413 A1 Sep. 18, 2003

(30) Foreign Application Priority Data

Mar. 13, 2002 (JP) ........................................ 2002-068774

(51) Int. Cl.[7] .............................. G02B 7/38; G03B 13/36
(52) U.S. Cl. .......................................... 359/698; 396/80
(58) Field of Search ...................... 359/698; 396/80–82; 348/350, 353–356

(56) References Cited

U.S. PATENT DOCUMENTS

2002/0140838 A1 * 10/2002 Yoshikawa .................. 348/345

FOREIGN PATENT DOCUMENTS

JP S55-76312 6/1980
JP H8-50227 2/1996

* cited by examiner

Primary Examiner—Scott J. Sugarman
Assistant Examiner—Deborah Raizen
(74) Attorney, Agent, or Firm—Arnold International; Jon W. Henry; Bruce Y. Arnold (57) ABSTRACT

An autofocus system for an imaging device that includes an image detecting element for image production at a focused image plane of an adjustable focus imaging lens that also includes four image detecting elements for focus detection arranged in pairs that are equidistant in front of, and behind, planes that are conjugate with the focused image plane. One pair of image detecting elements for focus detection are farther than the other pair from the conjugate planes and may be used alone for focusing based on the stop value or focal length of the adjustable focus imaging lens. Alternatively, the other pair of image detecting elements may be used for more accurate focusing after the one pair of image detecting elements is used. The use of two pairs of image detecting elements at different distances from the focused image plane provides accurate focusing over a wide range of object distances.

20 Claims, 8 Drawing Sheets

AUTOFOCUS SYSTEM

BACKGROUND OF THE INVENTION

The autofocus (hereinafter AF) of imaging devices, such as video cameras and similar cameras, using image detecting elements is generally based on the contrast mode. The contrast mode integrates high frequency components of projected image signals in some range (focus area) among projected image signals (brightness signals) obtained from an image detecting element as an evaluation value and automatically makes a focus adjustment so as to maximize the evaluation value. The contrast mode gives the best focus with a maximum sharpness (contrast) of an image at an image detecting element for image production. However, the contrast mode searches for the best focus while moving focusing lens elements in what is called a hill-climbing mode, which has the disadvantage of a slow rate of focusing.

Accordingly, AF systems and methods wherein the focus state (front focus, back focus and in-focus) of an imaging lens is detected to control the focus by using multiple image detecting elements with different optical path lengths have been proposed to resolve the drawback of such a contrast mode. These AF systems detect the focus state at the image detecting plane where an image detecting element for image production is located to control focus by positioning focus state detecting elements equidistant in front of and behind positions conjugate with the image detecting element for image production. The two focus state detecting elements obtain quantitative evaluation values indicative of the focus state at each of the pair of image detecting elements. A comparison of the magnitude of those evaluation values provides information about the focus state at the image detecting plane. However, conventional AF systems have the drawback that if the deviation of focus is too large, the difference in the evaluation values obtained from the two focus state detecting elements disappears, so that the focus state cannot be detected.

BRIEF SUMMARY OF THE INVENTION

The present invention relates to an AF system that controls the focus of an imaging lens by a contrast mode over a wide range of focus by using two pairs of focus state detecting elements to indicate the focus state at an image detecting plane.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION OF THE INVENTION

Figure 1:
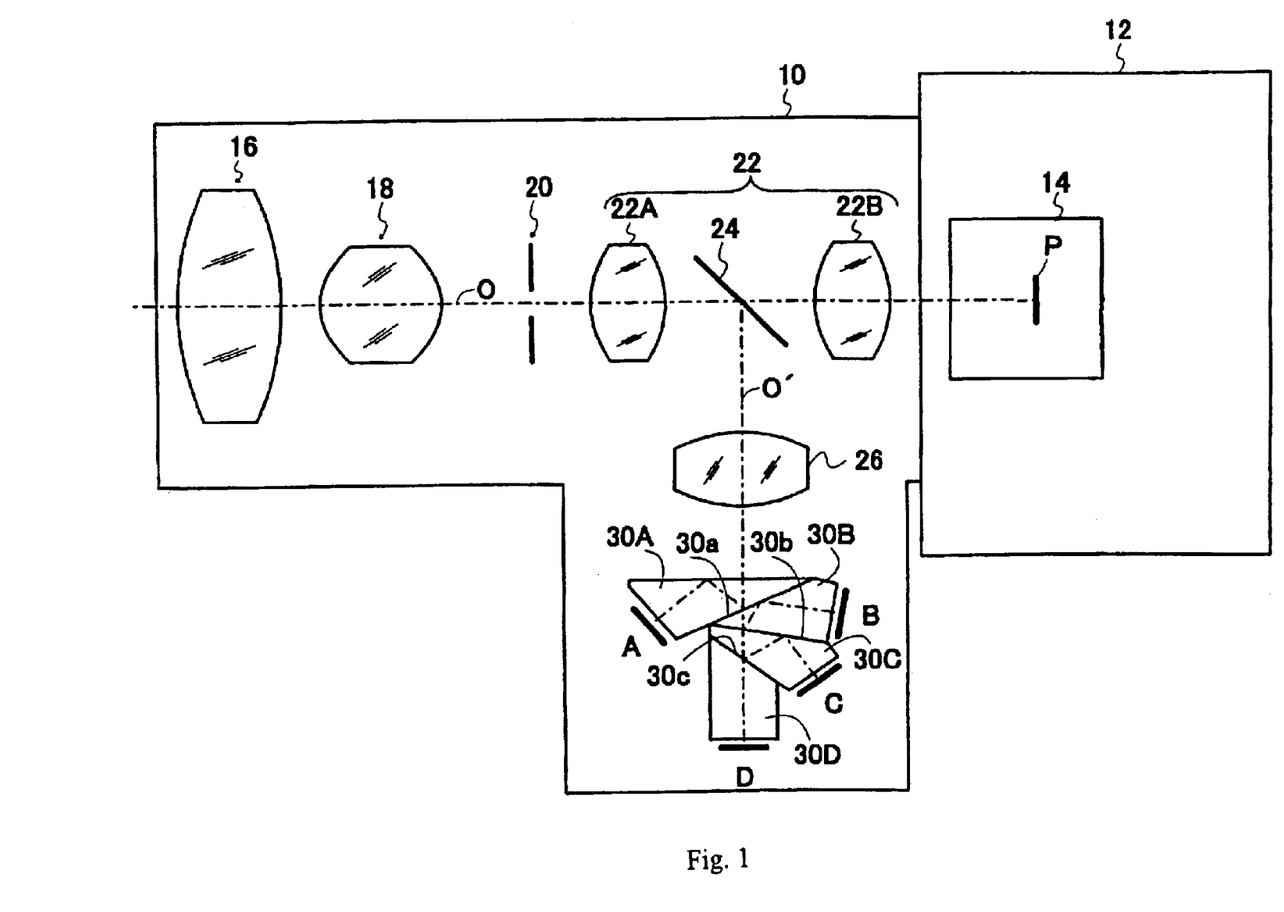
FIG. 1 shows a cross-sectional view of a TV camera using an AF system of the present invention.

A general description of the AF system of the present invention that pertains to both embodiments of the present invention will first be described with reference to FIGS. 1–4. FIG. 1 shows a cross-sectional view of a TV camera using the AF system of the present invention. As shown in FIG. 1, the TV camera includes an imaging lens 10 and a camera body 12. An image pickup unit 14 is located to receive an image at a focused image plane P. The image pickup unit outputs image signals that, together with circuits in the camera body, provide output image signals for display or recording.

The imaging lens 10 is installed to be detachably mounted on the front of the camera body by a detachable mount (not shown). As is generally known, a focus lens group 16, a zoom lens group 18, an iris 20, and a relay lens group 22 are included in the imaging lens 10. The construction of the lens groups shown in FIG. 1 is simplified, with lens groups composed of plural lenses being shown by one lens.

The relay lens group 22 includes a front relay lens component 22A, a back relay lens component 22B, and a partially reflecting mirror 24 between the front relay lens component 22A and the back relay lens component 22B. The partially reflecting mirror 24 is inclined at forty-five degrees to the optical axis O of the imaging lens 10 so that a portion of the object beam passing through the front relay lens component 22A is reflected at a right angle to the optical axis O along a deflected optical axis O'.

The portion of the object beam transmitted through the partially reflecting mirror 24 passes through the back relay lens component 22B, and then emerges from the rear side of the imaging lens 10 as an object beam for the projected image that is incident on the image detecting element for image production 14 of the camera body 12. Although not shown, the object beam incident into the image detecting plane for image production unit 14 is separated into light beams of three colors, red light, green light, and blue light, for example, by a color separation optical system, and the different color light beams are incident upon image pickup elements for projecting or recording a full color image. Moreover, images of different colors are all formed at focused image planes that are optically equivalent to the focused image plane P shown in FIG. 1.

On the other hand, the portion of the object beam reflected by the partially reflecting mirror 24 travels along an optical axis O' that is perpendicular to the optical axis O as the object beam for focus state detection. This object beam is collected by a relay lens group 26 and is transmitted to a focus state detection unit. The focus state detection unit includes four prisms 30A, 30B, 30C, and 30D, that form a light dividing optical system, and four focus state detecting elements A, B, C, and D for focus state detection.

The object beam for focus state detection of light reflected by the partially reflecting mirror 24 travels along the optical axis O' and is incident onto the first prism 30A. The object beam for focus state detection that is incident onto the first prism 30A is split into a reflected light beam and a transmitted light beam by a partially reflecting surface 30a of the first prism 30A. The reflected light beam is then incident upon the image detecting plane of the first focus state detecting element A, and the transmitted light beam is incident onto the second prism 30B.

The light transmitted by the first prism 30A is incident on the second prism 30B and is further split into a reflected light beam and a transmitted light beam by a partially reflecting surface 30b of the second prism 30B. The reflected light beam is then incident upon the image detecting plane of the second focus state detecting element B for focus state detection, and the transmitted light beam is further incident into the third prism 30C.

The light transmitted by the second prism 30B is incident on the third prism 30C and is further split into a reflected light beam and a transmitted light beam by a partially reflecting surface 30c of the third prism 30C. The reflected light beam is then incident upon the image detecting plane of the third focus state detecting element C, and the transmitted light beam passes through the fourth prism 30D and is incident onto the fourth focus state detecting element D.

Preferably, the three partially reflecting surfaces of the four prisms are designed so that the light beams incident upon each image detecting plane of the focus state detecting elements A, B, C, and D have the same intensity.

Figure 2:
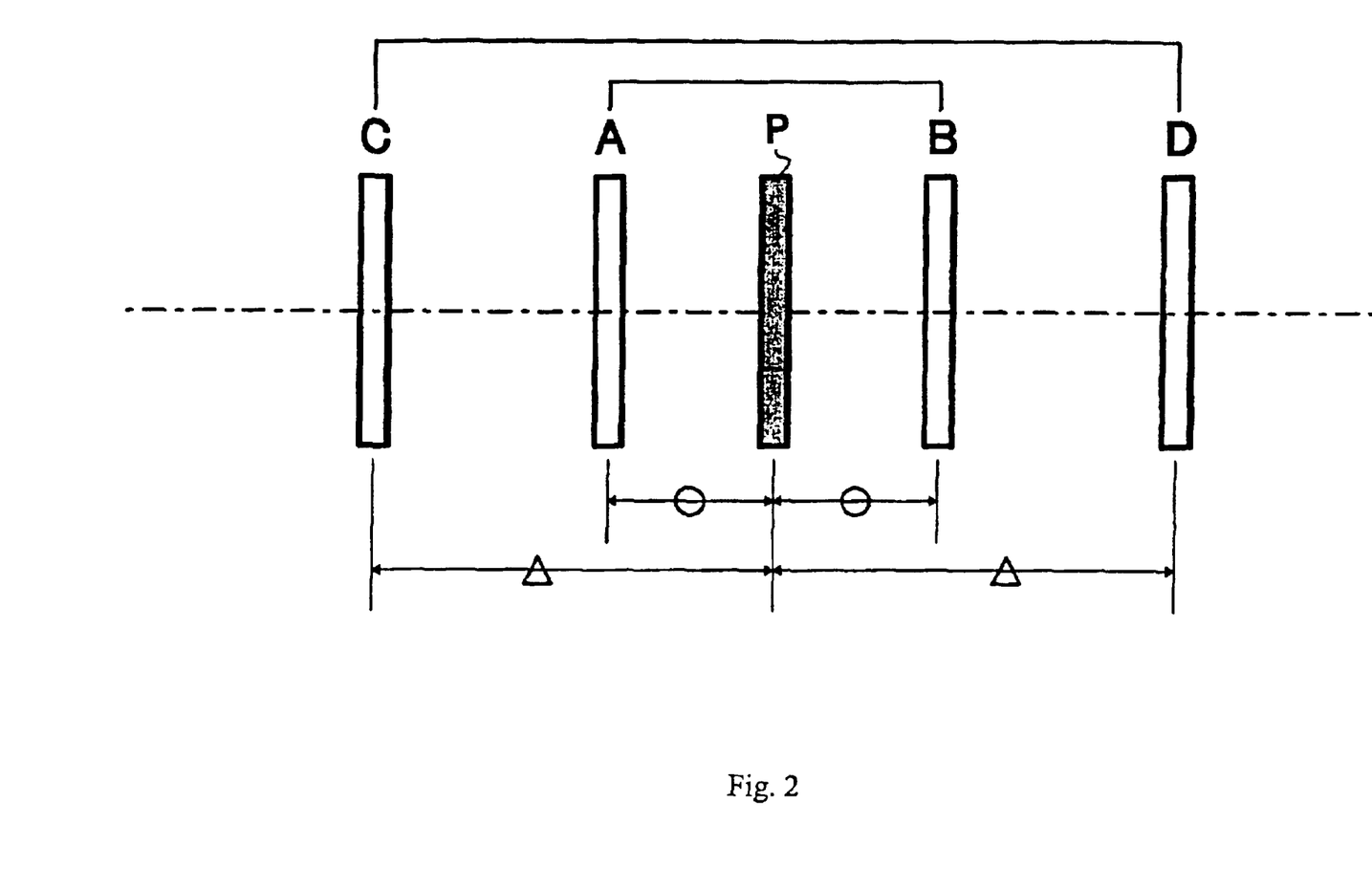
FIG. 2 shows, for purposes of explanation of operation only, the image detecting plane for image production and the image detecting planes for four focus state detecting elements being drawn as positioned along the same straight line; however, in actuality these image detecting planes are positioned, for example, as shown in FIG. 1.

FIG. 2 shows the image detecting plane for image production and the image detecting planes for object beams for focus state detection incident on the focus state detecting elements A, B, C, and D expressed on the same straight line representing an alignment of their optical axes. As shown in FIG. 2, the optical path lengths of the object beams for focus state detection that are incident onto each focus state detecting element A, B, C, and D are different, with C being the shortest optical path length, A being the next longer optical path length, B being the next longer optical path length, and D being the longest optical path length. Furthermore, these optical path lengths are related to the optical path length to the image detecting plane of image detecting unit 14, as illustrated in FIG. 2.

As shown in FIG. 2, the optical path of the object beam at the image detecting element for image production (along optical axis O) ends midway between the two focus state detecting elements A and B and also midway between the two focus state detecting elements C and D at focused image plane P. That is, the first focus state detecting element A and the second focus state detecting element B are equidistant in front of, and behind, positions that are conjugate to the position of the image detecting element for image production, and the third focus state detecting element C and the fourth focus state detecting element D are equidistant in front of, and behind, positions that are conjugate to the position of the image detecting element for image production so as to sandwich the first focus state detecting element A and the second focus state detecting element B. Thus, the first focus state detecting element A and the second focus state detecting element B detect object images that are equidistant from (in front of and behind) positions that are conjugate with the image detecting. The third focus state detecting element C and the fourth focus state detecting element D detect object images in positions which are farther from the image detecting element for image production than the first focus state detecting element A and the second focus state detecting element B. Moreover, because it is unnecessary that the focus state detecting elements A, B, C, and D detect different color images, these detecting elements may use CCD's sensitive only to the intensity or brightness of the light that is used in producing or recording black and white images.

Figure 3:
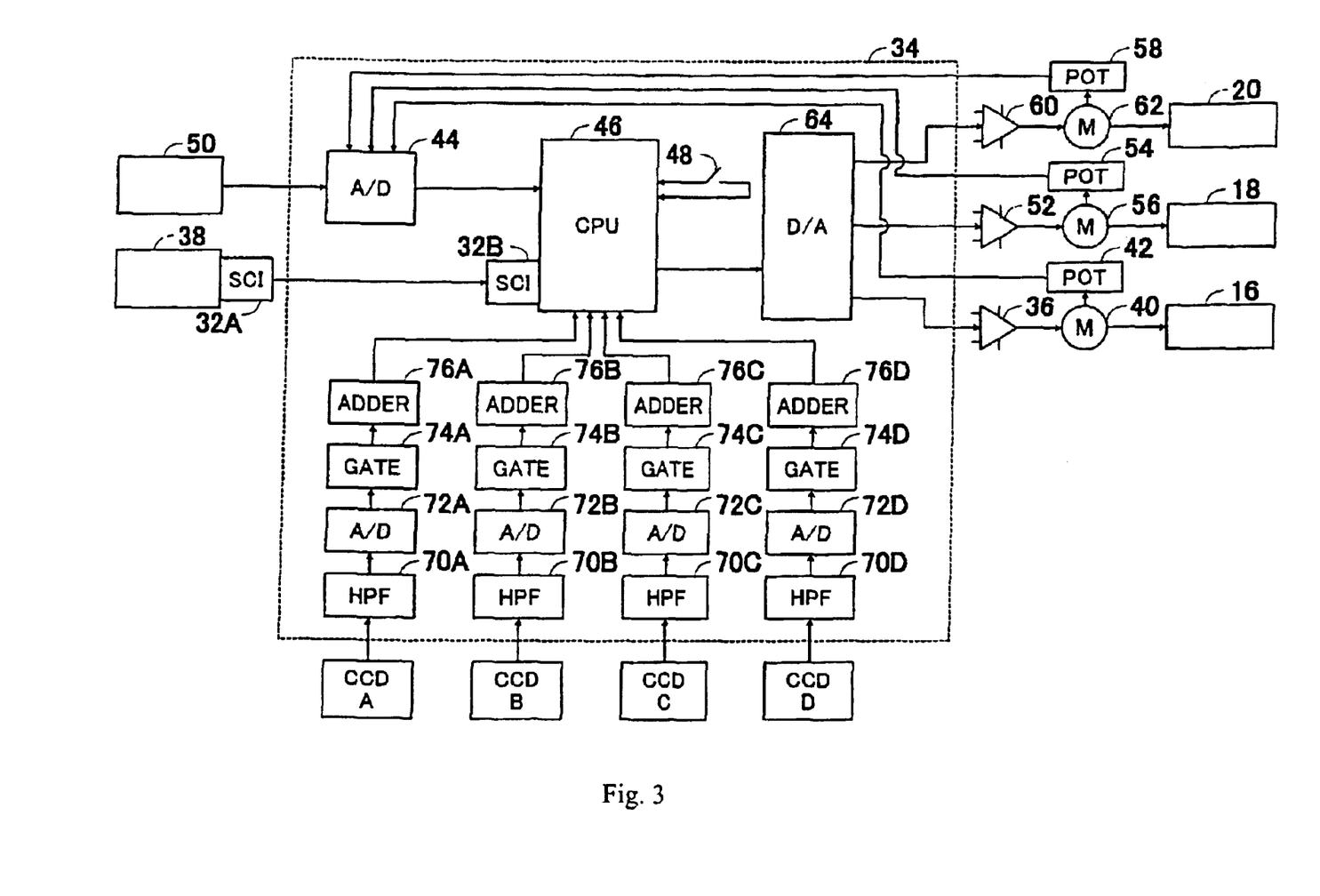
FIG. 3 is a schematic block diagram of the electrically connected elements of an AF system of the present invention.

FIG. 3 is a schematic block diagram of the electrically connected elements of the AF system of the present invention. As shown in FIG. 3, the image signals produced by the focus state detecting elements A, B, C, and D are output to a signal processing unit 34 and, as will be described in more detail later, the focus state of the imaging lens 10 is determined based on image signals obtained from the focus state detecting elements A, B, C, and D. Then, in case the focus mode is in AF mode, a control signal is output to a focus motor driving circuit 36 based on a focus state detected, as described later, to perform AF control of the focus of the imaging lens 10.

On the other hand, if the camera is in manual focus (hereinafter MF) mode, a driving signal for driving a focus motor 40 is output to a focus motor driving circuit 36 based on an operation of focus command circuit 38 so as to perform MF control of the imaging lens 10. This focus command circuit 38 provides manual control of the focusing of the imaging lens 10 by manual rotation of a focus knob (not shown), with the moving position of focus lens group 16 being output as focus command data to the signal processing unit 34 via a serial communication interface (hereinafter SCI) 32A according to the amount of rotation of the focus knob.

As shown in FIG. 3, the signal processing unit 34 inputs the focus command data from the focus command circuit 38 to CPU 46 via a SCI 32B. The CPU 46 controls the movement of the focus lens group 16 based on the focus command data and the position data input from a potentiometer 42 via an A/D converter 44, and outputs a control signal to the focus motor 40 from the focus motor driving circuit 36 via a D/A converter 64. Switching the focus mode is performed by the ON/OFF operation of an AF switch 48. If the AF switch is turned ON, the AF mode is active and the CPU 46 executes AF control.

Furthermore, the signal processing unit 34 outputs a control signal to a zoom motor driving circuit 52 based on operating information of a zoom command circuit 50 for controlling zooming of the imaging lens 10. The zoom command circuit 50 outputs zoom command data for controlling the velocity of a zoom lens group 18 according to the direction and amount of rotation of a manually rotatable zoom control knob (not shown). The signal processing unit 34 inputs this zoom command data to CPU 46 via the A/D converter 44. The CPU 46 controls the movement of the zoom lens group 18 based on position data of the zoom lens group 18 input from a zoom potentiometer 54 via the A/D converter 44 and outputs a control signal to a zoom motor 56 from the zoom motor driving circuit 52 via a D/A converter 64.

Still further, the CPU 46 of the signal processing unit 34 controls the output of an iris control motor 62 based on stop value data input from an iris potentiometer 58 via the A/D converter 44 and an iris control signal from a control on the camera body and outputs a control signal to the iris motor 62 from an iris motor control circuit 60 via the D/A converter 64.

Next, the process of detection of the focus state by the signal processing unit 34 will be described. As shown in FIG. 3, images of an object detected by the focus state detecting elements A–D are output as video signals of a predetermined form. Those video signals are converted to signals $V_A$, $V_B$, $V_C$, and $V_D$, that define evaluation values of the sharpness of the images (contrast of images) at each of the focus state detecting elements A–D, by high-pass filters 70A–70D, A/D converters 72A–72D, gate circuits 74A–74D and adders 76A–76D before being output to CPU 46. The video signals output from the focus state detecting elements A–D are brightness signals because, CCD's that are sensitive only to the intensity or brightness of the light are used for the focus state detecting elements A–D.

In the process of detection of the focus state, first the video signals output from the focus state detecting elements A–D are input to the high-pass filters 70A–70D, and their high frequency components are extracted. Signals of the high frequency components extracted by the high-pass filters 70A–70D are converted to digital signals by the A/D converters 72A–72D. Then, digital signals corresponding to image elements in a predetermined focus area (for example, in the central part of the images, for one field scan of each of the focus state detecting elements A–D), are extracted by the gate circuits 74A–74D, and values of the digital signals in the extracted range are added by the adders 76A–76D. Thereby, the sum of the values of the high frequency components of the video signals in each of the predetermined focus areas is obtained, and the obtained values become the evaluation values $V_A$–$V_D$ that indicate the image sharpness in each predetermined focus area.

Moreover, various synchronous signals are given from a synchronous signal generating circuit (not shown) to control synchronism of processing of the circuits for the focus state detecting elements A–D and gate circuits 74A–74D. Furthermore, a vertical synchronous signal for every one field of video signals is provided by the synchronous signal generating circuit in the CPU 46.

The CPU 46 detects the current focus state of the imaging lens 10 in the image detecting lane (focused image plane P) of the image detecting element for image production based on the valuation values $V_A$–$V_D$ obtained as described above. The method by which the CPU 46 detects he focus state of the imaging lens 10 is explained as follows with regard to FIG. 4.

Figure 4:
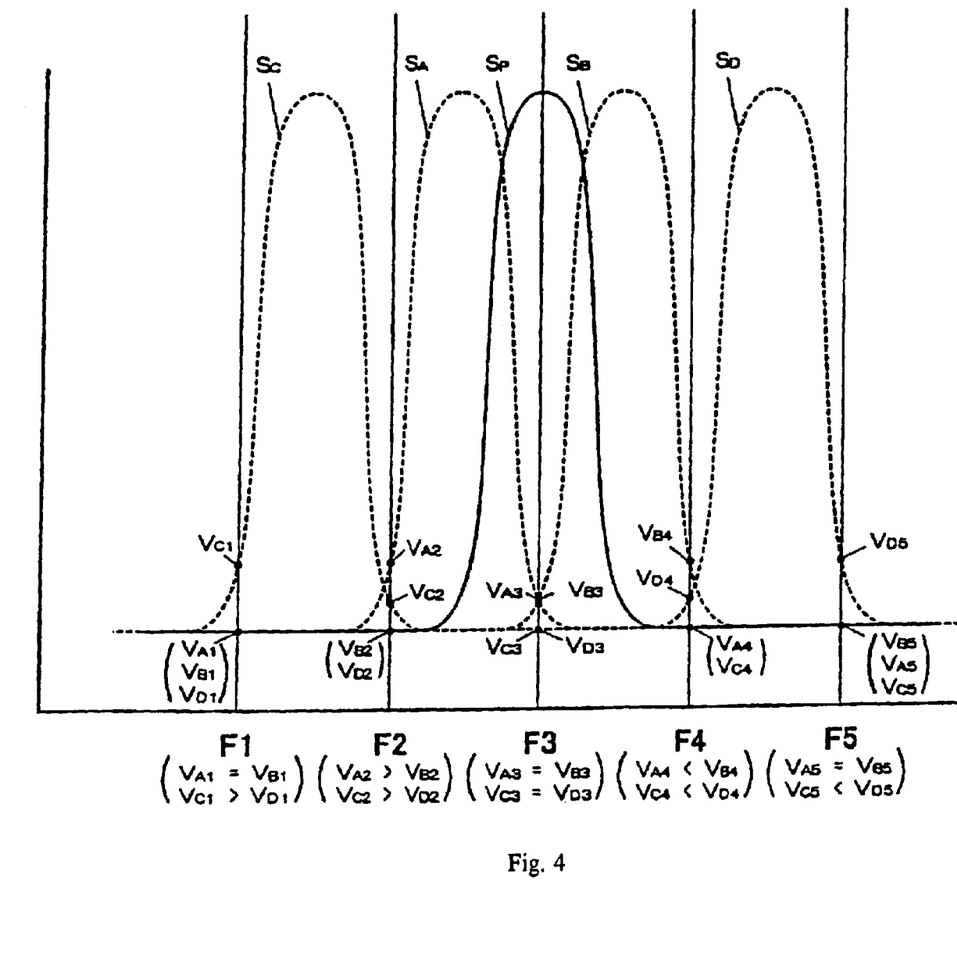
FIG. 4 shows evaluation values (Y-axis) plotted against focus position (X-axis) during focus detection of an image of an object of an AF system of the present invention.

FIG. 4 shows evaluation values plotted against the focus position during focus detection of an image of an object with the focus positions along the horizontal axis and the evaluation values along the vertical axis. A curve Sp indicated by a solid line in FIG. 4 and centered at position F3 shows the evaluation value that would be associated with an image detecting element for image production. The position F3, with the maximum evaluation value of the curve Sp, is the position of best focus where the image detecting element for image production is desirably located. Curves $S_A$, $S_B$, $S_C$, $S_D$, indicated by dotted lines, show the evaluation values obtained from the focus state detecting elements A–D at different focus positions.

When the focus position of the imaging lens 10 is set to a position F2 nearer than a focused position F3, the evaluation values obtained from the focus state detecting elements A–D are $V_{A2}$, $V_{B2}$, $V_{C2}$, $V_{D2}$ of the curves $S_A$–$S_D$, which correspond to the position F2. As shown in FIG. 4, at the focus position F2, the evaluation value $V_{A2}$ obtained from the first focus state detecting element A is greater than the evaluation value $V_{B2}$ obtained from the second focus state detecting element B, and the evaluation value $V_{C2}$ obtained from the third focus state detecting element C is greater than the evaluation value $V_{D2}$ obtained from the fourth focus state detecting element D. Accordingly, it can be determined from those evaluation values that the focus position of the imaging lens 10 is nearer than the focus position F3, that is, a position of front focus, based on the evaluation value $V_{A2}$ obtained from the first focus state detecting element A being greater than the evaluation value $V_{B2}$ obtained from the second focus state detecting element B and the evaluation value $V_{C2}$ obtained from the third focus state detecting element C being greater than the evaluation value $V_{D2}$ obtained from the fourth focus state detecting element D.

When the focus position of the imaging lens set to a position F1 even closer than the position F2, the evaluation values obtained from the focus state detecting elements A–D are $V_{A1}$, $V_{B1}$, $V_{C1}$, $V_{D1}$ of the curves $S_A$–$S_D$, which correspond to the position F1. As shown in FIG. 4, at the position F1, the evaluation value $V_{A1}$ obtained from the first focus state detecting element A and the evaluation value $V_{B1}$ obtained from the second focus state detecting element B are equal, but the evaluation value $V_{C1}$ obtained from the third focus state detecting element C is different from the evaluation value $V_{D1}$ obtained from the fourth focus state detecting element D, with the evaluation value $V_{C1}$ obtained from the third focus state detecting element C being greater than the evaluation value $V_{D1}$ obtained from the fourth focus state detecting element D. Accordingly, it can be determined from those evaluation values that the focus position of the imaging lens 10 is nearer than the focus position F2, as well as nearer than the focused position F3, that is, a position of extreme front focus, based on the evaluation value $V_{C1}$ obtained from the third focus state detecting element C being greater than the evaluation value $V_{D1}$ obtained from the fourth focus state detecting element D and where the evaluation value $V_{A1}$ obtained from the first focus state detecting element A and the evaluation value $V_{B1}$ obtained from the second focus state detecting element B being equal.

On the other hand, when the focus position of the imaging lens 10 is set to a position F4 on the far side of the position F3, the evaluation values obtained from the focus state detecting elements A–D are $V_{A4}$, $V_{B4}$, $V_{C4}$, $V_{D4}$ of the curves $S_A$–$S_D$, which correspond to the position F4. As shown in FIG. 4, the evaluation value $V_{A4}$ obtained from the first focus state detecting element A is less than the evaluation value $V_{B4}$, obtained from the second focus state detecting element B, and the evaluation value $V_{C4}$ obtained from the third focus state detecting element C is less than the evaluation value $V_{D4}$ obtained from the fourth focus state detecting element D. Accordingly, it can be determined from those evaluation values that the focus position of the imaging lens 10 is farther from the focused position F3, that is, a position of back focus, based on the evaluation value $V_{A4}$ obtained from the first focus state detecting element A being less than the evaluation value $V_{BA}$ obtained from the second focus state detecting element B, and the evaluation value $V_{C4}$ obtained from the third focus state detecting element C being less than the evaluation value $V_{D4}$ obtained from the fourth focus state detecting element D.

When the focus position of the imaging lens 10 is set to a position F5 even farther than the position F4, the evaluation values obtained from the focus state detecting elements A–D are $V_{A5}$, $V_{B5}$, $V_{C5}$, $V_{D5}$ of the curves $S_A$–$S_D$, which correspond to the position F5. As shown in FIG. 4, at the position F5, the evaluation value $V_{A5}$ obtained from the first focus state detecting element A and the evaluation value $V_{B5}$ obtained from the second focus state detecting element B are equal, but the evaluation value $V_{C5}$ obtained from the third focus state detecting element C is less than the evaluation value $V_{D5}$ obtained from the fourth focus state detecting element D. Accordingly, it can be determined that the focus position F5 is farther than the focused position F3, as well as farther than the focus position F4, that is, a position of extreme back focus, based on the evaluation value $V_{C5}$ obtained from the third focus state detecting element C being less than the evaluation value $V_{D5}$ obtained from the fourth focus state detecting element D, and the evaluation value $V_{A5}$ obtained from the first focus state detecting element A and the evaluation value $V_{B5}$ obtained from the second focus state detecting element B being equal.

Different from the above focus settings, when the focus position of the imaging lens 10 is set to the focused position F3, the evaluation values obtained from the focus state detecting elements A–D become values $V_{A3}$, $V_{B3}$, $V_{C3}$, $V_{D3}$ of the curves $S_A$–$S_D$, that correspond to the position F3. As shown in FIG. 4, at position F3, the evaluation values $V_{A3}$ obtained from the first focus state detecting element A and the evaluation value $V_{B3}$ obtained from the second focus state detecting element B are equal, and the evaluation value $V_{C3}$ obtained from the third focus state detecting element C and the evaluation value $V_{D3}$ obtained from the fourth focus state detecting element D are also equal. Accordingly, it can be determined that the imaging lens 10 is in the desirable focused position F3 based on the evaluation value $V_{A3}$ obtained from the first focus state detecting element A and the evaluation value $V_{B3}$ obtained from the second focus state detecting element B being equal, and the evaluation value $V_{C3}$ obtained from the third focus state detecting element C and the evaluation value $V_{D3}$ obtained from the fourth focus state detecting element D also being equal.

As described above, the focus state of the imaging lens 10 can be detected by comparing the evaluation value $V_A$ obtained from the first focus state detecting element A and the evaluation value $V_B$ obtained from the second focus state detecting element B and comparing the evaluation value $V_C$ obtained from the third focus state detecting element C and the evaluation value $V_D$ obtained from the fourth focus state detecting element D for focus state detection. Even if the focus position of the imaging lens 10 sharply deviates from the desired focused position F3, the detection of the focus state can be made not only by a comparison between the evaluation value $V_A$ obtained from the first focus state detecting element A and the evaluation value $V_B$ obtained from the second focus state detecting element B but also by a comparison between the evaluation value $V_C$ obtained from the third focus state detecting element C and the evaluation value $V_D$ obtained from the fourth focus state detecting element D.

The CPU 46 controls the focus of the imaging lens 10 based on the focus position of the imaging lens 10 detected as described above. Namely, it controls the focus so that the evaluation value $V_A$ obtained from the first focus state detecting element A and the evaluation value $V_B$ obtained from the second focus state detecting element B are equal and controls the focus so that the evaluation value $V_C$ obtained from the third focus state detecting element C and the evaluation value $V_D$ obtained from the fourth focus state detecting element D are equal. Thereby, the focus position of the imaging lens 10 is matched with the focused position F3.

Highly accurate focusing is made possible by comparing the focus based on the evaluation values $V_C$, $V_D$ obtained from the third focus state detecting element C and the fourth focus state detecting element D, respectively, and then comparing the focus based on the evaluation values $V_A$, $V_B$ obtained from the first focus state detecting element A and the second focus state detecting element B, respectively. Namely, if the focus position of the imaging lens 10 approaches the focused position F3, the difference between evaluation value $V_C$ and evaluation value $V_D$ disposed in positions far from images planes conjugate to the image detecting plane (focused image plane P) of image detecting elements for image production decreases. Therefore, the focus position may be far from the focused position F3 even when the evaluation value $V_C$ and the evaluation value $V_D$ are equal. On the other hand, if the focus position of the imaging lens 10 approaches the focused position F3, more information of evaluation values can be obtained from the first focus state detecting element A and the second focus state detecting element B.

Consequently, highly accurate focusing is made possible, even if such accurate focusing cannot be fully achieved based only on the evaluation values $V_C$ and $V_D$. By using these evaluation values to bring the focus position of the imaging lens 10 close to the focused position F3 and then further controlling the focus position based on the evaluation values $V_A$, $V_B$ obtained from the first focus state detecting element A and the second focus state detecting element B, accurate focusing is made possible.

Two preferred embodiments of the AF system of the present invention will now be individually described with further reference to the drawings.

EMBODIMENT 1

Figure 5:
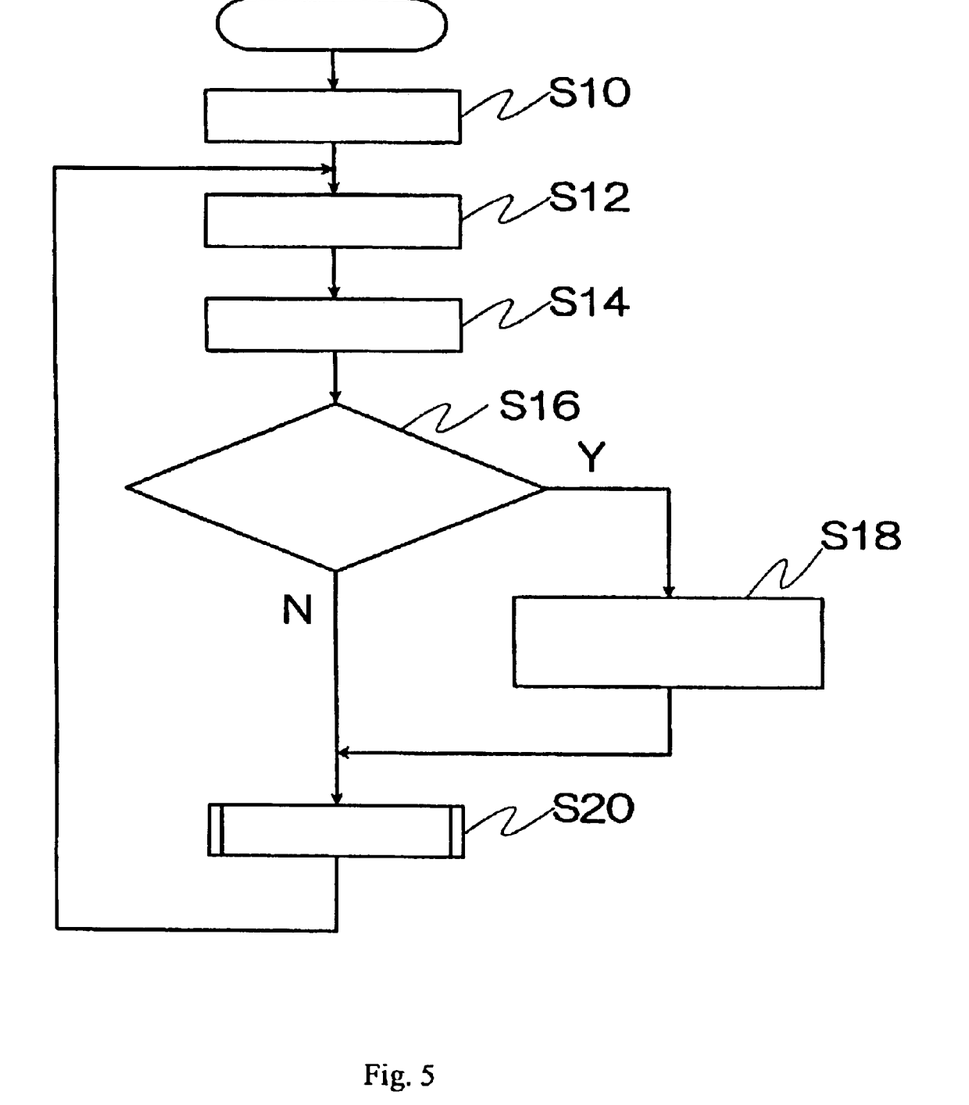
FIG. 5 is a flow chart of a process of initiating focus control of an AF system of the present invention.
Figure 6:
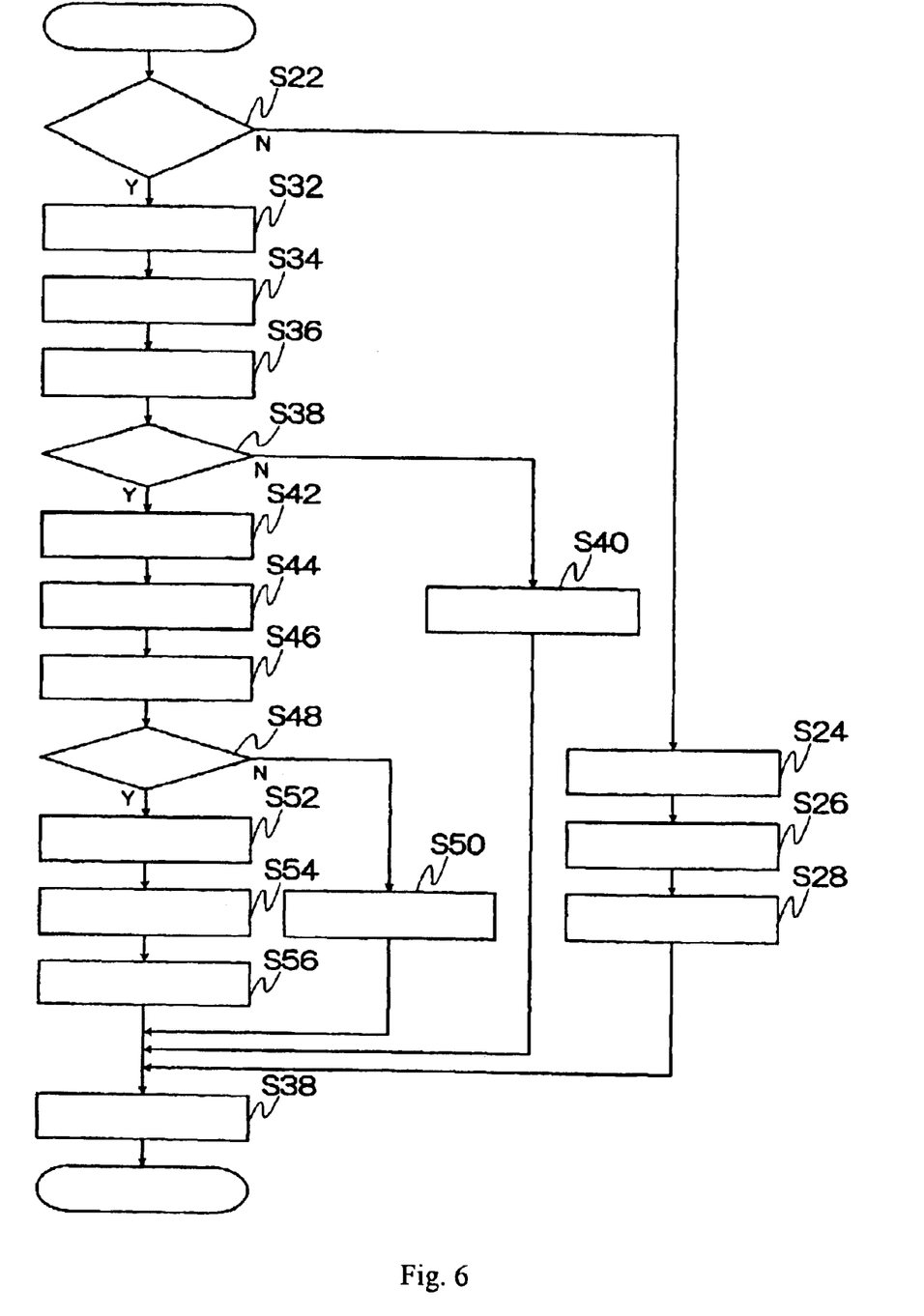
FIG. 6 is a flow chart of a process of executing focus control of an AF system according to Embodiment 1 of the present invention.

Embodiment 1 of the process of focus control of an imaging lens of the present invention will be described with reference to the flow charts shown in FIG. 5 and FIG. 6. As shown in FIG. 5, a CPU 46 makes a required initial setting (Step S10), then makes an iris control based on an iris control signal given from a camera body 12 (Step S12). Subsequently, the CPU 46 controls zooming of the imaging lens 10 based on operational information of a zoom command circuit 50 (Step S14). Next, the CPU 46 determines if an AF switch 48 is turned ON (Step S16). If the AF switch 48 is turned ON, the CPU turns ON the AF start flag (Step S18) and starts focus control (Step S20). As shown in FIG. 6, the CPU determines whether an AF start flag is turned ON (Step S22). If the CPU determines that the AF start flag is turned ON, the CPU performs an AF control. If the CPU determines that the AF start flag is turned OFF, the CPU performs a MF control.

In the case of MF mode, that is, if the AF start flag is OFF, first the CPU 46 acquires positional data FPOSI of the focus lens 16 from a focus potentiometer 42 (Step S24) and acquires focus command data FCTRL from a focus command circuit 38 (Step S26). Then, the CPU 46 calculates the moving speed FSPEED (FSPEED=FPOSI−FCTRL) for moving the focus lens 16 to a focus position from the focus command circuit 38 and outputs the obtained moving speed to a focus motor driving circuit 36 as focus speed control data FSPEED (Step S28). The focus motor driving circuit 36 drives focus motor 40 based on the focus speed control data FSPEED from the CPU 46 and moves the focus lens 16 to a focus position determined by the focus command circuit 38.

On the other hand, in the case of AF control, that is, if the AF start flag is ON, first the CPU 46 acquires an evaluation value $V_C$ of the third focus state detecting element C (Step S32) and an evaluation value $V_D$ of the fourth focus state detecting element D (Step S34). Next, the CPU 46 calculates a difference $\Delta V_{C\text{-}D}(\Delta V_{C\text{-}D}=V_C-V_D)$ between the evaluation value $V_C$ acquired from the third focus state detecting element C and the evaluation value $V_D$ acquired from the fourth focus state detecting element D (Step S36). As described above, the difference $\Delta V_{C\text{-}D}$ between the evaluation value $V_C$ and the evaluation value $V_D$ indicates the focus position of an object image formed on the image detecting plane of the image detecting element for image production. When the imaging lens 10 is in the focused position F3, the difference $\Delta V_{C-D}$ is zero.

Accordingly, the CPU 46 determines whether the difference $\Delta V_{C-D}$ of the evaluation values is zero (Step S38), and if not, determines that the imaging lens 10 is not in the focusing state and executes the focus control. Namely, the CPU 46 converts the calculated difference $\Delta V_{C-D}$ of the evaluation values to focus speed control data FSPEED (Step S40) and outputs the data to the focus motor driving circuit 36 (Step S40). The focus motor driving circuit 36 drives the focus motor 40 and moves the focus lens 16 based on the focus speed control data FSPEED from the CPU 46. Then, the above process is repeated until the difference $\Delta V_{C-D}$ between the evaluation value $V_C$ acquired from the third focus state detecting element C and the evaluation value $V_D$ of the fourth focus state detecting element D becomes zero.

If the difference $\Delta V_{C-D}$ between the evaluation value $V_C$ acquired from the third focus state detecting element C and the evaluation value $V_D$ acquired from the fourth focus state detecting element D becomes zero as described above, the imaging lens 10 is moved closer to the focused position F3. However, the third focus state detecting element C and the fourth focus state detecting element D are positioned so far from positions conjugate to the focused position F3, there is concern that the difference $\Delta V_{C-D}$ will be determined to be zero even before the focused position F3 is achieved.

Therefore, when the difference $\Delta V_{C-D}$ between the evaluation value $V_C$ and the evaluation value $V_D$ becomes zero, the CPU 46 then carries out further focus control based on the evaluation values $V_A$ and $V_B$ obtained from the first focus state detecting element A and the second focus state detecting element B in order to perform even more accurate focusing, as described below. First, the CPU 46 acquires an evaluation value $V_A$ of the first focus state detecting element A (Step S42) and an evaluation value $V_B$ of the second focus state detecting element B (Step S44). Next, the CPU 46 calculates the difference $\Delta V_{A-B}(\Delta V_{A-B}=V_A-V_B)$ between the evaluation value VA acquired from the first focus state detecting element A and the evaluation value $V_B$ of the second focus state detecting element B (Step S46). Then, the CPU determines whether the obtained difference $\Delta V_{A-B}$ is zero (Step S48).

If the CPU determines that the difference $\Delta V_{A-B}$ is not zero, the CPU 46 determines that the imaging lens 10 is not in the focused position F3 and executes further focus control in accordance with the imaging lens 10 not being in the focused position F3. Namely, the CPU converts the difference $\Delta V_{A-B}$ of evaluation values to focus speed control data FSPEED and outputs the data to the focus motor driving circuit 36 (Step S50). The focus motor driving circuit 36 drives the focus motor 40 and moves the focus lens 16 based on the focus speed control data FSPEED from the CPU 46. Then, the above processing is repeated until the difference $\Delta V_{A-B}$ between the evaluation value $V_A$ and the evaluation value V, becomes zero. Then, when the difference $\Delta V_{A-B}$ between the evaluation value $V_A$ and the evaluation value $V_B$ becomes zero, the CPU 46 determines that the imaging lens 10 is in the focused position F3, turns the AF start flag OFF (Step S52), and ends the focus control. Then, the CPU 46 acquires positional data FPOSI of the focus lens 16 from the focus potentiometer 42 and rewrites focus command data FCTRL as the positional data FPOSI of the focus lens 16 (focus command data FCTRL=positional data FPOSI)(Step S54) to make the focus command data FCTRL the value corresponding to the current position of the focus lens 16. Afterward, the CPU 46 carries out the MF mode based on the operation of focus command circuit 38 and, if the AF switch is turned ON, carries out the AF mode again based on the evaluation values $V_A$, $V_B$, $V_C$, $V_D$ acquired from the focus state detecting elements A, B, C, D, respectively.

As described above, even if the focus position of the imaging lens 10 sharply deviates from the focused position F3, the AF system of Embodiment 1 enables detecting the focus state of the imaging lens 10 based not only on the evaluation values obtained from the first focus state detecting element A and the second focus state detecting element B but also the evaluation values obtained from the third focus state detecting element C and the fourth focus state detecting element D. Moreover, highly accurate focusing over a wide range is made possible by focus control based on the evaluation values obtained from the third focus state detecting element C and the fourth focus state detecting element D, followed by the focus control based on the evaluation values obtained from the first focus state detecting element A and the second focus state detecting element B during the focus control.

EMBODIMENT 2

Embodiment 2 of the present invention will be described with reference to FIGS. 7 and 8. Because Embodiment 2 is similar to Embodiment 1, primarily only differences between Embodiment 2 and Embodiment 1 will be explained for Embodiment 2.

Generally, as the iris of the imaging lens 10 is made smaller to define a larger stop value (F-number), the evaluation value curves become more nearly flat and the maxima of the evaluation curves decreases. FIG. 8 shows an evaluation value curve associated with a focused position P with a small iris. If the iris is small enough to define a large enough stop value, focusing control based only on the evaluation values obtained from the third focus state detecting element C and the fourth focus state detecting element D can be made accurately even if the focus position of the imaging lens 10 is close to the focused position F3.

Figure 7:
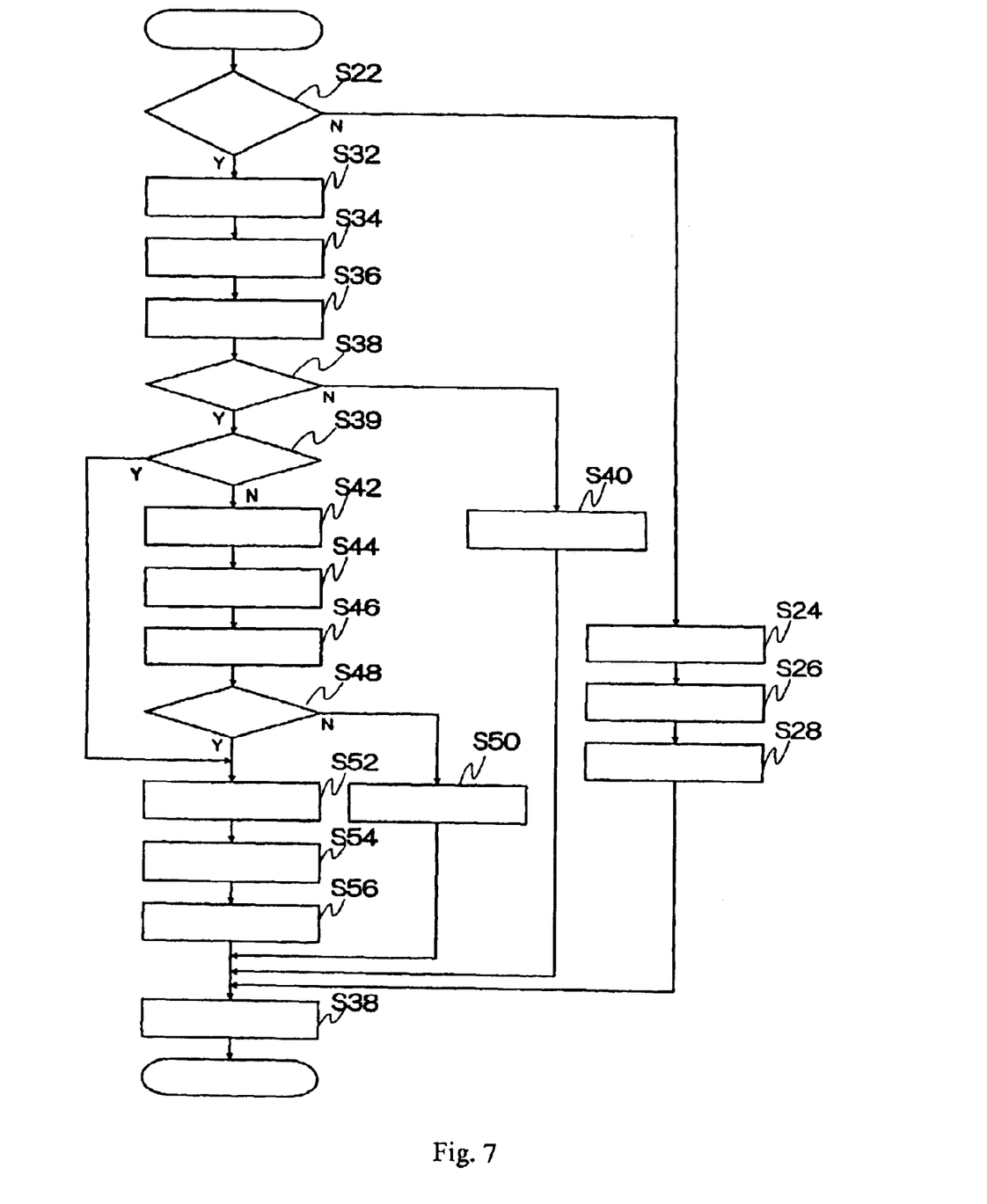
FIG. 7 is a flow chart of a process of executing focus control of an AF system according to Embodiment 2 of the present invention.
Figure 8:
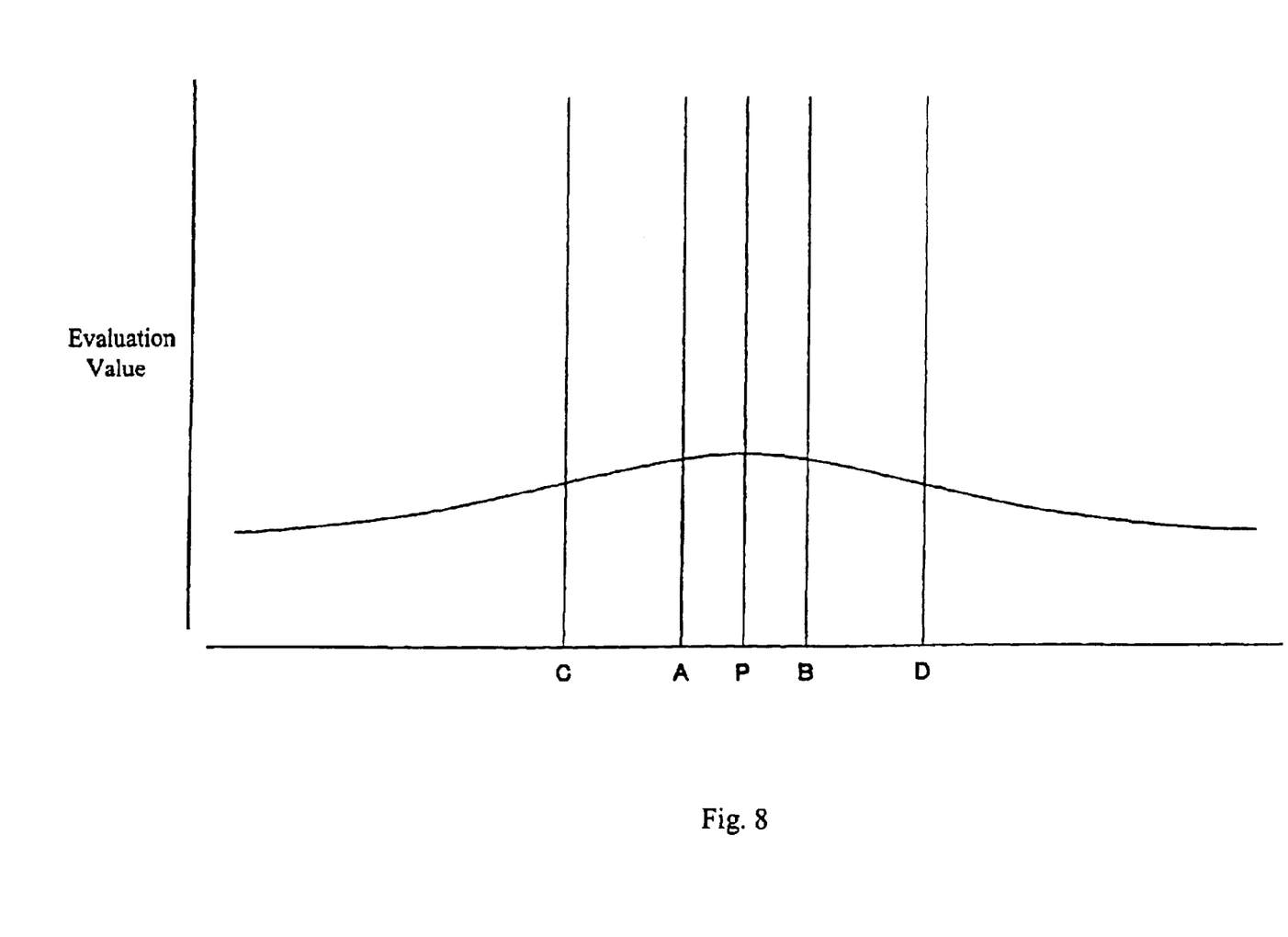
FIG. 8 shows an evaluation value curve with the evaluation values (Y-axis) plotted against the focus position (X-axis).

FIG. 7 is a flow chart of the process of focus control of an imaging lens of Embodiment 2 of the present invention wherein when the stop value (F-number) is more than a predetermined threshold value, focus control is performed by using only evaluation value information obtained from the third focus state detecting element C and the fourth focus state detecting element D, and without using evaluation value information obtained from the first focus state detecting element A and the second focus state detecting element B for focus state detection. Specifically, as shown in FIG. 7, the CPU 46 performs the focus control based on the evaluation value $V_C$ acquired from the third focus state detecting element C and the evaluation value $V_D$ acquired from the fourth focus state detecting element D for focus state detection. If the difference $\Delta V_{C-D}$ between the evaluation value $V_C$ and the evaluation value $V_D$ is zero, stop value data is acquired from an iris potentiometer 58. Then, the CPU 46 compares the stop value (F-number) and the predetermined threshold value (Step S39).

If the CPU 46 determines that the stop value (F-number) is greater than the predetermined threshold value, the CPU 46 turns the AF start flag OFF (Step S52) and ends the AF control based on the imaging lens 10 being in the focused position F3. On the other hand, if the current stop value (F-number) is less than the predetermined threshold value, the CPU 46 acquires evaluation values $V_A$ and $V_B$ from the first focus state detecting element A and the second focus state detecting element B, respectively, and carries out the focus control based on the acquired evaluation values $V_A$ and $V_B$.

Thus, if the stop value (F-number) of the imaging lens 10 is greater than the predetermined threshold value, that is, when the iris is relatively small, focusing can be done quickly and correctly by the focus control being based only on the evaluation values obtained from the third focus state detecting element C and the fourth focus state detecting element D for focus state detection. When the curves of evaluation values are gently sloping as described above, the focus control based on the evaluation values obtained from the third focus state detecting element C and the fourth focus state detecting element D enables accurate focusing based only on the evaluation values obtained from the third focus state detecting element C and the fourth focus state detecting element D. For example, if the zoom ratio increases, that is, the focal length is increased during zooming, so that the stop value exceeds the threshold value, the focus control is performed as above based only on the evaluation values obtained from the third focus state detecting element C and the fourth focus state detecting element D. This is to provide a stronger signal, since using the first focus state detecting element A and the second focus state detecting element B would provide too small a signal for focusing, since the difference from the maximum is so slight.

The present invention is not limited to the aforementioned embodiments, as it will be obvious that various alternative implementations are possible. For instance, the present invention was described for use in video cameras or similar cameras but may be used in a variety of types of cameras, such as still cameras that take static or single frame pictures, moving picture cameras, and including television cameras and photographic cameras. Additionally, the present invention is not restricted to the object beam for focus state detection being split into four light beams by three prisms as a light dividing optical system for projecting onto the four image detecting elements. For example, prism 30D shown in FIG. 1 may be omitted. Further, although preferably equal intensity light beams are provided to the four image detecting elements, different intensity light beams might be used and, for example, the evaluation values adjusted by weighing factors inversely proportional to the relative intensities of the different light beams before the evaluation values are compared. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. An autofocus system for an imaging device that includes an image detecting element for image production positioned to receive a focused image at a focused image plane from an adjustable focus imaging lens that receives incident light, the autofocus system comprising:

two inner focus state detecting elements, a first inner focus state detecting element being in front of a first position that is conjugate with the focused image plane, a second inner focus state detecting element being behind a second position that is conjugate with the focused image plane, and the first inner focus state detecting element being at a first distance from the first position that equals the distance of the second inner focus state detecting element from the second position;

two outer focus state detecting elements, a first outer focus state detecting element being in front of a third position that is conjugate with the focused image plane, a second outer focus state detecting element being behind a fourth position that is conjugate with the focused image plane, the first outer focus state detecting element being at a second distance from the third position that equals the distance the second outer focus state detecting element is from the fourth position, and wherein the second distance is greater than the first distance;

light dividing means for dividing light that passes through said adjustable focus imaging element so as to direct some of the light toward said image detecting element for image production and to direct some of the light toward each of the inner and outer focus state detecting elements;

evaluation means for obtaining evaluation values indicative of the sharpness of an image at each of the inner and outer focus state detecting elements;

first comparison means for comparing the evaluation values of the outer focus state detecting elements;

second comparison means for comparing the evaluation values of the inner focus state detecting elements; and control means for controlling the focus of the adjustable focus imaging lens based on a comparison of the evaluation values of the outer focus state detecting elements by the first comparison means, or based on a comparison of the evaluation values of the outer focus state detecting elements by the first comparison means and a comparison of the evaluation values of the inner focus state detecting elements by the second comparison means.

2. The autofocus system of claim 1, wherein the second comparison means compares the evaluation values of the inner focus state detecting elements after the first comparison means compares the evaluation values of the outer focus state detecting elements.

3. The autofocus system of claim 2, wherein said control means controls the focus of the adjustable focus imaging lens based on the first comparison means determining that the evaluation values of the outer focus state detecting elements are equal and the second comparison means determining that the evaluation values of the inner focus state detecting elements are equal.

4. The autofocus system of claim 1, further comprising:

stop value detecting means for detecting the stop value of the adjustable focus imaging lens; and stop value comparison means for comparing the stop value of the adjustable focus imaging lens determined by the stop value detecting means with a threshold value; wherein when said stop value comparison means determines that the stop value of the adjustable focus imaging lens is greater than the threshold value, said control means controls the focus of the adjustable focus imaging lens based only on a comparison of the evaluation values of the outer focus state detecting elements by the first comparison means.

5. The autofocus system of claim 4, wherein said control means controls the focus of the adjustable focus imaging lens based on the first comparison means determining that the evaluation values of the outer focus state detecting elements are equal.

6. The autofocus system of claim 1, and further comprising:
focal length detecting means for detecting the focal length of the adjustable focus imaging lens; and
focal length comparison means for comparing the focal length of the adjustable focus imaging lens with a threshold value; wherein
when said focal length comparison means determines that the focal length of the adjustable focus imaging lens is greater than the threshold value, said means for controlling the focus of the adjustable focus imaging lens controls the focus of the adjustable focus imaging lens based only on a comparison of the evaluation values of the outer focus state detecting elements by the first comparison means.

7. The autofocus system of claim 6, wherein said control means controls the focus of the adjustable focus imaging lens based on the first comparison means determining that the evaluation values of the outer focus state detecting elements are equal.

8. The autofocus system of claim 1, wherein said light dividing means divides the light directed toward said image detecting element for image production from light directed toward the inner and outer focus state detecting elements and then divides some of the light directed toward the inner and outer focus state detecting elements toward each of the inner and outer focus state detecting elements, and wherein said light dividing means directs light of equal intensity toward each of the inner and outer focus state detecting elements.

9. The autofocus system of claim 2, wherein said light dividing means divides the light directed toward said image detecting element for image production from light directed toward the inner and outer focus state detecting elements and then divides some of the light directed toward the inner and outer focus state detecting elements toward each of the inner and outer focus state detecting elements, and wherein said light dividing means directs light of equal intensity toward each of the inner and outer focus state detecting elements.

10. The autofocus system of claim 3, wherein said light dividing means divides the light directed toward said image detecting element for image production from light directed toward the inner and outer focus state detecting elements and then divides some of the light directed toward the inner and outer focus state detecting elements toward each of the inner and outer focus state detecting elements, and wherein said light dividing means directs light of equal intensity toward each of the inner and outer focus state detecting elements.

11. The autofocus system of claim 4, wherein said light dividing means divides the light directed toward said image detecting element for image production from light directed toward the inner and outer focus state detecting elements and then divides some of the light directed toward the inner and outer focus state detecting elements toward each of the inner and outer focus state detecting elements, and wherein said light dividing means directs light of equal intensity- toward each of the inner and outer focus state detecting elements.

12. The autofocus system of claim 5, wherein said light dividing means divides the light directed toward said image detecting element for image production from light directed toward the inner and outer focus state detecting elements and then divides some of the light directed toward the inner and outer focus state detecting elements toward each of the inner and outer focus state detecting elements, and wherein said light dividing means directs light of equal intensity toward each of the inner and outer focus state detecting elements.

13. The autofocus system of claim 6, wherein said light dividing means divides the light directed toward said image detecting element for image production from light directed toward the inner and outer focus state detecting elements and then divides some of the light directed toward the inner and outer focus state detecting elements toward each of the inner and outer focus state detecting elements, and wherein said light dividing means directs light of equal intensity toward each of the inner and outer focus state detecting elements.

14. The autofocus system of claim 7, wherein said light dividing means divides the light directed toward said image detecting element for image production from light directed toward the inner and outer focus state detecting elements and then divides some of the light directed toward the inner and outer focus state detecting elements toward each of the inner and outer focus state detecting elements, and wherein said light dividing means directs light of equal intensity toward each of the inner and outer focus state detecting elements.

15. The autofocus system of claim 8, wherein said light dividing means includes a first light dividing system that includes at least one partially reflecting surface that divides the light directed toward said image detecting element for image production from light directed toward the inner and outer focus state detecting elements, and a second light dividing system that includes a plurality of partially reflecting surfaces that divide the light directed toward the inner and outer focus state detecting elements among the inner and outer focus state detecting elements.

16. The autofocus system of claim 9, wherein said light dividing means includes a first light dividing system that includes at least one partially reflecting surface that divides the light directed toward said image detecting element for image production from light directed toward the inner and outer focus state detecting elements, and a second light dividing system that includes a plurality of partially reflecting surfaces that divide the light directed toward the inner and outer focus state detecting elements among the inner and outer focus state detecting elements.

17. The autofocus system of claim 10, wherein said light dividing means includes a first light dividing system that includes at least one partially reflecting surface that divides the light directed toward said image detecting element for image production from light directed toward the inner and outer focus state detecting elements, and a second light dividing system that includes a plurality of partially reflecting surfaces that divide the light directed toward the inner and outer focus state detecting elements among the inner and outer focus state detecting elements.

18. The autofocus system of claim 11, wherein said light dividing means includes a first light dividing system that includes at least one partially reflecting surface that divides the light directed toward said image detecting element for image production from light directed toward the inner and outer focus state detecting elements, and a second light dividing system that includes a plurality of partially reflecting surfaces that divide the light directed toward the inner and outer focus state detecting elements among the inner and outer focus state detecting elements.

19. The autofocus system of claim 12, wherein said light dividing means includes a first light dividing system that includes at least one partially reflecting surface that divides the light directed toward said image detecting element for image production from light directed toward the inner and outer focus state detecting elements, and a second light dividing system that includes a plurality of partially reflecting surfaces that divide the light directed toward the inner and outer focus state detecting elements among the inner and outer focus state detecting elements.

20. The autofocus system of claim 13, wherein said light dividing means includes a first light dividing system that includes at least one partially reflecting surface that divides the light directed toward said image detecting element for image production from light directed toward the inner and outer focus state detecting elements, and a second light dividing system that includes a plurality of partially reflecting surfaces that divide the light directed toward the inner and outer focus state detecting elements among the inner and outer focus state detecting elements.

* * * * *

UNITED STATES PATENT AND TRADEMARK OFFICE
CERTIFICATE OF CORRECTION

PATENT NO. : 6,809,883 B2
DATED : October 26, 2004
INVENTOR(S) : Yahagi et al.

It is certified that error appears in the above-identified patent and that said Letters Patent is hereby corrected as shown below:

Title page,
Item [57], ABSTRACT,
Line 7, change "detection are" to -- detection is --;

Column 2,
Line 59, change "optical axis 0" to -- optical axis O --;

Column 5,
Line 37, change "detecting lane" to -- detecting plane --;

Column 6,
Line 10, change "imaging lens" to -- imaging lens 10 is --;
Line 42, delete the comma after "$V_{B4}$";

Column 7,
Line 36, change "$V_D$obtained" to -- $V_D$ obtained --;

Column 8,
Line 2, change "images" to -- image --;

Column 9,
Line 58, change "value V," to -- value $V_B$ --; and

Column 13,
Line 58, delete the hyphen after "intensity".

Signed and Sealed this

Twenty-sixth Day of April, 2005

JON W. DUDAS
*Director of the United States Patent and Trademark Office*